Aug. 18, 1925.

J. C. MORTON

ANTITHEFT DEVICE

Filed Nov. 2, 1923

1,550,092

INVENTOR
JAMES C. MORTON
BY Fetherstonhaugh & Co
ATTORNEYS

Patented Aug. 18, 1925.

1,550,092

UNITED STATES PATENT OFFICE.

JAMES C. MORTON, OF MONTREAL, QUEBEC, CANADA.

ANTITHEFT DEVICE.

Application filed November 2, 1923. Serial No. 672,388.

*To all whom it may concern:*

Be it known that I, JAMES C. MORTON, a subject of the King of Great Britain, and resident of the city of Montreal, in the Province of Quebec and Dominion of Canada, have invented certain new and useful Improvements in Antitheft Devices, of which the following is a full, clear, and exact description.

This invention relates to new and useful improvements in antitheft devices for automobiles or the like, and the object of the invention is to provide a simple, efficient and inexpensive device which will simultaneously lock certain parts of the control mechanism of the vehicle in such a manner that it will afford positive protection against thieves.

Another object is to provide an antitheft device for automobiles or the like, which will be easily assembled on all classes of machines.

In my invention, I provide a bar having two knee-shaped projections spaced from one another, one portion of each projection being adapted to lie parallel with the bar. The bar is mounted on suitable bearings on an automobile or the like and one end of said bar is adapted to fit into a lock. The parts of the knees lying parallel with the bar are adapted to engage with apertures formed in the clutch and brake pedals when the bar is in the locked position. A spring is provided for releasing the bar immediately the lock is released.

In the drawings which illustrate the invention;—

Figure 1:
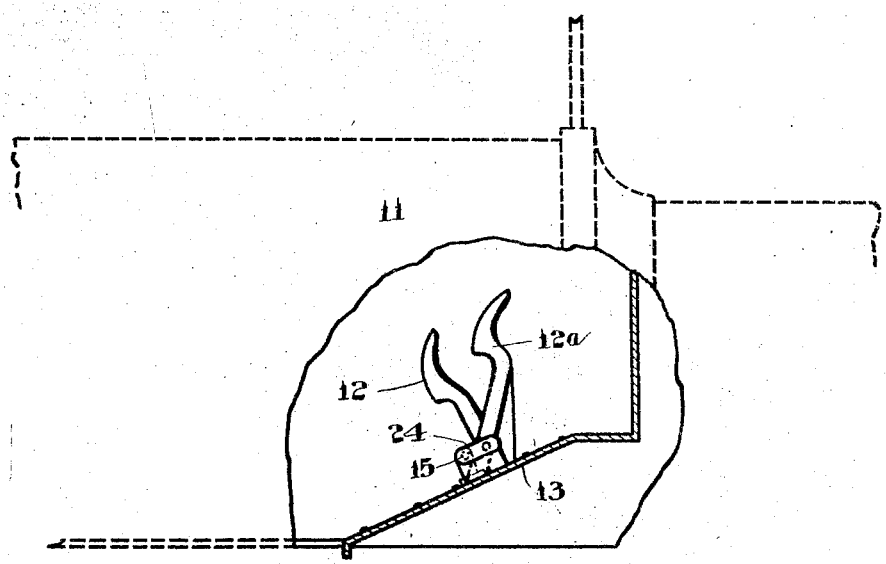
Fig. 1 is a diagrammatic view of the device mounted on the foot plate of an automobile.
Figure 2:
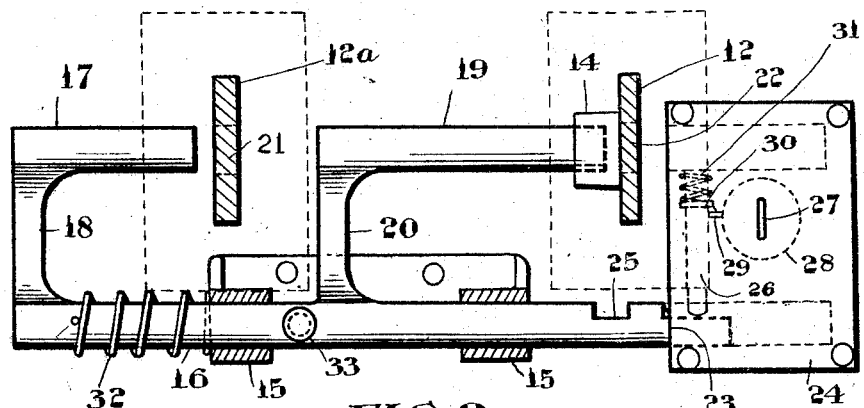
Fig. 2 is a detail of the locking mechanism.

Referring more particularly to the drawings, 11 designates a partial side elevation of an automobile provided with the brake pedal 12 and the clutch pedal 12ª projecting above the foot plate 13. The brake pedal 12 is provided with a projecting lug 14, which is adapted to position the lever in a certain desired position hereinafter described. Slidably mounted on a bearing 15 secured to the foot plate 13 is the locking bar 16, which is provided with two knee-shaped projections 18 and 20 spaced from one another. The parts 17 and 19 of the knee projections are adapted to lie parallel with the bar 16. Clutch lever 12ª is provided with an aperture 21 so positioned that the part 17 of the knee projection 18 will engage with said aperture when the clutch is in the neutral or "off" position. Brake pedal 12 is provided with an aperture 22, so positioned that it will engage with the portion 19 of the knee projection 20 when the brake is in the "on" position. The stop or projecting lug 14 engages with the part 19 of the bar and guides same into engagement with the aperture 22. The end 23 of the bar 16 is adapted to engage with a lock 24 and is provided with notches 25 into which the plunger 26 is adapted to fit. To operate the plunger, a key is fitted into an aperture 27 formed in the barrel 28, which is provided with projecting pins 29 adapted to engage with the shoulder 30 formed in the pin. The plunger is held in the locked position by the spring 31 acting against the shoulder. The lock shown is only for illustrative purposes and any of the well known types of locks may be used for this purpose. A spring 32 is mounted on the bar 16 and is adapted to engage with the bearing 15 to hold the portions 17 and 19 clear of the levers when the automobile is in the unlocked position. A handle 33 may be provided on the bar 16 to operate the locking mechanism. This handle may also be so positioned to act as a stop against the action of the spring 32.

The operation of the device is as follows:—

To lock the automobile immediately on leaving the car, the brake pedal is depressed to the "on" position and the clutch pedal is placed in the neutral position. The brake pedal is provided with a projection adapted to position same, so that the projection 19 will engage with an aperture formed in the said pedal. The bar 16 is operated manually and is moved in the horizontal direction to engage with the lock. When the bar is in the locked position, both pedals are locked against movement. To release or unlock the lever, the lock is released and the spring 32 throws the portions 17 and 19 clear of the pedals and allows free movement of the same. The operating handle may be used as a stop to prevent excessive movement of the locking bar in the unlocking direction.

Having thus described my invention, what I claim is;—

Pedal locking means comprising a casing adapted to be secured to the floor boards of an automobile and provided with a pair of spaced sockets located at or adjacent the ends of said casing and open at one side thereof, locking means mounted in the casing between said socket including a bolt adapted to enter one of said sockets, tubular bearing members adapted to be attached to the floor boards in line with the last mentioned socket, a rod slidably mounted in said bearing members with one end of the rod operating in said last mentioned socket and notched for engagement with said bolt, a pair of spaced L shaped projections carried by said rod with one arm of each projection directed toward the casing and extending in parallel relation with reference to said rod, the arm of one of said projections being adapted to enter the remaining socket of the casing when the rod is moved to a predetermined position, an abutment carried by the rod and opposing one of said bearings and a spring encircling the rod between the abutment and said bearing and serving to move the rod in a direction away from said casing upon disengagement of said bolt with the notched portion of the rod.

In witness whereof, I have hereunto set my hand.

JAMES C. MORTON.